United States Patent [19]

Nakano et al.

[11] Patent Number: 4,615,033

[45] Date of Patent: Sep. 30, 1986

[54] ARGON GAS LASER DEVICE

[75] Inventors: Hirotaka Nakano, Yokohama; Tatumi Goto, Yamato, both of Japan

[73] Assignee: Tokyo Shibaura Denki Kabushiki Kaisha, Kanagawa, Japan

[21] Appl. No.: 386,351

[22] Filed: Jun. 8, 1982

[30] Foreign Application Priority Data

Jun. 8, 1981 [JP] Japan ................... 56-86903

[51] Int. Cl.$^4$ ................................ H01S 3/08
[52] U.S. Cl. ........................ 372/99; 372/92; 372/108; 350/164; 350/166
[58] Field of Search ........... 372/55, 99, 23, 98, 372/108, 107, 92; 350/164, 166

[56] References Cited

U.S. PATENT DOCUMENTS

| 4,009,453 | 2/1977 | Mahlein | 350/166 |
| 4,099,840 | 7/1978 | van der Wal et al. | 372/99 |
| 4,132,959 | 1/1979 | Bouwhuis et al. | 372/99 |
| 4,201,954 | 5/1980 | van der Wal et al. | 350/166 |

FOREIGN PATENT DOCUMENTS 1198933  8/1965  Fed. Rep. of Germany ........ 372/99

OTHER PUBLICATIONS

Matsuda et al; "Air Cooled Argon-Ion Laser"; Toshiba Review, No. 124, Nov.-Dec. 1979.
Kutagin et al; "A Pulsed Laser Employing Ar+ Ions at High Currents and Low Pressures"; Zhurnal. Prik. Spect., vol. 5; No. 4, pp. 534–535, 1966.

Primary Examiner—Leon Scott, Jr.
Attorney, Agent, or Firm—Banner, Birch, McKie & Beckett

[57] ABSTRACT

According to this invention the argon gas laser for emitting monochromatic light at 4880 Å is provided comprising an elongated envelope with a capillary filled mainly with argon gas, an optical resonator comprising a high reflectance multilayer mirror and an output coupling multilayer mirror facing each other and disposed along the optical axis of the envelope. A cathode electrode and an anode electrode are disposed within the envelope for discharging the gas. Each mirror comprising alternate stacked layers of relatively high refractive index materials and relatively low refractive index materials. The high reflective mirror having a high reflectance band with a center wavelength $\lambda_0$ containing a laser wavelength $\lambda_L$ within said band which satisfies the following expression:

$$\lambda_0 + 3/16 \cdot 2\Delta g < \lambda_L < \lambda_0 + \tfrac{3}{8} \cdot 2\Delta g$$

where $2\Delta g$ is a band width of the high reflectance band and $\lambda_L$ is selected to 4880 Å. The output coupling mirror comprises a multilayer mirror having a layer number less than the number of layers used to form the high reflectance mirror. The high reflectance band of the output coupling mirror has a center wavelength longer than 4880 Å and transmittance from about 3% to about 6%.

6 Claims, 6 Drawing Figures

ARGON GAS LASER DEVICE

BACKGROUND OF THE INVENTION

This invention relates to an argon gas laser device and more particularly to the mirror construction of an optical resonator thereof.

Recently, there has been wide use of laser devices in the fields of photography, photocopying and the like. The laser is used for scanning a photosensitive plate or luminescent screen for reproducing an image. Generally, a photosensitive plate or the like has maximum sensitivity in the short wavelength region of the light spectrum; consequently, it is desired to use laser devices emitting light of short wavelength, such as emitting light between the green and ultraviolet region.

It is well known that an argon gas laser is the most suitable laser device for this purpose. Laser wavelengths emitted by this device are 4545 Å, 4579 Å, 4658 Å, 4727 Å, 4765 Å, 4880 Å, 4965 Å, 5017 Å, 5145 Å and 5287 Å; the emitted wavelengths of 4765 Å, 4880 Å, 4965 Å, 5145 Å provide a high laser gain, while the remaining wavelengths provide a much lower gain. It is desirable to have monochromatic oscillation of one of these higher gain wavelengths to effectively emit a strong laser light.

There are several prior art systems to selectively emit monochromatic laser light of a predetermined wavelength. One such laser device utilizes an optical resonator wherein a prism is provided to disperse the undesired wavelengths. In that system, however, there is a tendency for the resonator's oscillation to decrease due to scattering losses on the surface of the prism and transmission losses within the prism. These losses occur even if the prism is disposed at the Brewster angle. In this prior art system, adjustment of the optical resonator's prism is very complicated and precise, and continuous and stable operation of the laser is very difficult to maintain. This is due to the fact that small changes in operating conditions, such as ambient temperature or mechanical vibration, sharply affects the performance of the laser since the prisms dispersion characteristic or alignment can concomitantly vary.

The use of a diffraction grating has also been proposed in the prior art. Such a system, however, has substantially the same disadvantages described above for the prism type optical resonators.

A further system has been proposed whereby filtering properties are added to a mirror of an optical resonator to produce the desired monochromatic output of the argon laser (see Japanese Patent Publication No. 44-29436). In this prior art system, the mirror comprises multiple dielectric layers, and the spectral dispersion properties of the multiple layers are utilized to filter certain laser wavelengths. As described above, the light emitted from an argon gas laser produces ten wavelengths wherein the difference between the longest wavelength and the shortest wavelength is 742 Å and the interval between two adjacent wavelengths are within the range of 34 Å to 142 Å. The spectral characteristics of the combined multilayer mirror is practically determined from refractive indices of the combined dielectrics, and has a relatively wide reflectance band (see Japanese Publication No. 44-29436: B-FIG. 3). For example, in the case of the dielectric combination of ZnS and MgF₂, the reflectance band is approximately 1800 Å.

Accordingly, in this prior art system, a high reflectance mirror and an output coupling mirror are used to produce an oscillated output composed of virtually only the 5145 Å wavelength. The construction of the multilayered high reflective mirror is designed to have a lower end cutoff of the reflectance band between 5017 Å and 5145 Å. As a result, the 5017 Å wavelength and the other shorter wavelengths are cut off, while the two remaining longer argon laser wavelengths, 5145 Å and 5287 Å, are reflected. However, since the 5287 Å wavelength has a negligibly small oscillated gain or output, the system produces an output substantially comprising the high gain 5145 Å wavelength.

With this prior art system, the high reflective mirror can also be designed so that the oscillated output is composed of virtually only the 4765 Å wavelength. In this case, the upper end cutoff of the reflectance band is selected to be between 4765 Å and 4880 Å. As a result, the 4765 Å wavelength and the other shorter wavelengths are reflected while the 4880 Å and the other longer wavelengths are cut off. Since, as discussed above, the 4545 Å–4727 Å have a negligibly small gain, the laser produces an output substantially comprising the high gain 4765 Å wavelength.

This prior art system, however, has the disadvantage of permitting the monochromatic selection of only the uppermost and lowermost high gain wavelengths, 4765 Å and 5145 Å, respectively. The other intermediate high gain wavelengths (i.e., 4880 Å and 4965 Å) cannot be obtained. In fact, the highest gain wavelength cannot be monochromatically obtained (i.e., 4880 Å). In addition, since this prior art method requires the cutoff wavelength to be sufficiently close to either the uppermost or lowermost high gain wavelengths, any change in the reflectance band can produce instability of the system. There is a tendency for the spectral characteristics of a multilayer mirror, comprising, for example, ZnS and MgF₂, to frequently change which, in turn, can affect the oscillation and stability of the laser. It has been found that the spectral characteristic changes due to a tendency for the thickness of the multilayer mirror to shrink.

SUMMARY OF THE INVENTION

It is an object of this invention to provide an argon gas laser device having increased reliability, stability and efficiency and permitting monochromatic operation at 4880 Å (i.e., 4879.90 Å).

It is an object of the present invention to produce monochromatic light at the highest gain while having a short wavelength (i.e., 4879.90 Å).

According to this invention the argon gas laser for emitting monochromatic light at 4880 Å is provided comprising an elongated envelope with a capillary filled mainly with argon gas, an optical resonator comprising a high reflectance multilayer mirror and an output coupling multilayer mirror facing each other and disposed along the optical axis of the envelope. A cathode electrode and an anode electrode are disposed within the envelope for discharging the gas. Each mirror comprising alternate stacked layers of relatively high refractive index materials and relatively low refractive index materials. The high reflective mirror having a high reflectance band with a center wavelength $\lambda_0$ containing a laser wavelength $\lambda_L$ within said band which satisfies the following expression:

$$\lambda_0 + 3/16 \cdot 2\Delta g < \lambda_L < \lambda_0 + \tfrac{5}{8} \cdot 2\Delta g$$

where $2\Delta g$ is a band width of the high reflectance band and $\lambda_L$ is selected to be 4880 Å.

The output coupling mirror comprises a multilayer mirror having a layer number less than the number of layers used to form the high reflectance mirror. The high reflectance band of the output coupling mirror has a center wavelength longer than 4880 Å and transmittance from about 3% to about 6%.

DETAILED DESCRIPTION OF THE PREFERRED EMBODIMENT

Figure 1:
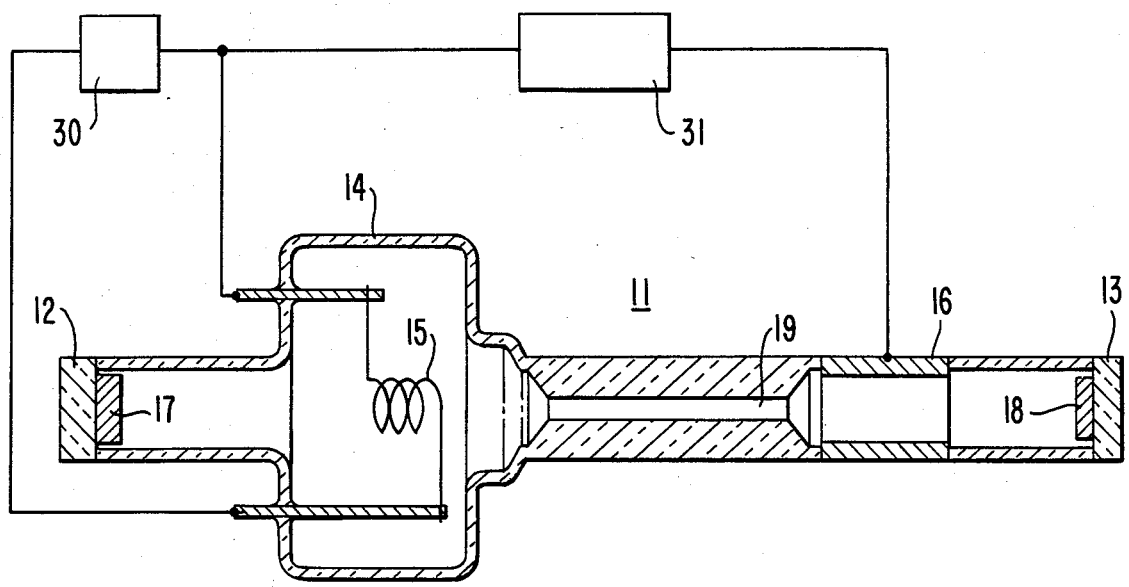
FIG. 1 is a schematic longitudinal sectional view of one embodiment of the invention.

FIG. 1 shows one embodiment of the invention. A tubular elongated glass envelope 11, containing a capillary portion 19 of 1 mm inner diameter, is sealed at both ends thereof, by means of optically polished glass plate substrates 12, 13. Capillary portion 19 has an axis which is positioned along the optical axis of envelope 11. Glass envelope 11 is filled with argon gas under a suitable pressure, for example 1.5 torr.

Adjacent one end of envelope 11 is an enlarged envelope portion 14. Positioned within enlarged portion 14 is a thermal cathode electrode 15 having a coiled filament. Adjacent end plate 13, at the other end of the envelope is a hollow cylindrical anode electrode 16 which comprises a portion of the envelope.

An inner mirror-type optical resonator is positioned within envelope 11 and comprises a high reflectance mirror 17 disposed on the inside surface of end plate 12 and an output coupling mirror 18 disposed on inside surface of end plate 13. Mirrors 17 and 18 face each other and are disposed along the optical axis of the envelope. The distance between mirrors 17 and 18 is 300 mm, and the effective discharge length between electrodes 15 and 16 is 36 mm.

Each mirror 17, 18 comprises a multilayer structure formed by alternately depositing a layer of titanium dioxide having a high refractive index (e.g., n=2.3) and a layer of silicon dioxide having a low refractive index (e.g., n=1.47); each layer has an optical thickness of a quarter wavelength (i.e., a quarter wave stack).

Figure 2:
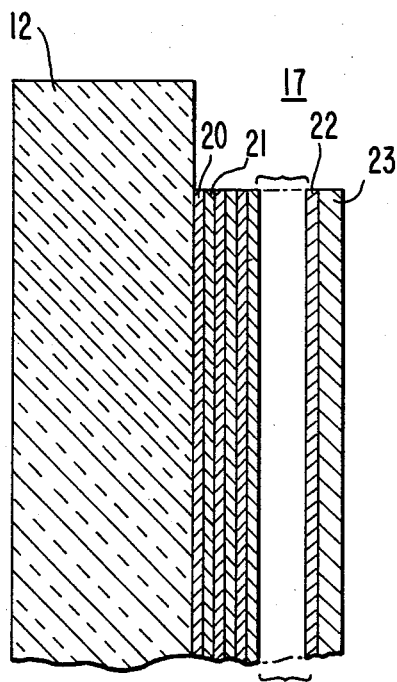
FIG. 2 is an enlarged cross-sectional view of the high reflectance mirror shown in FIG. 1.

As shown in FIG. 2, high reflectance mirror 17 is formed by evaporating a first layer 20 of titanium dioxide on plate 12; a second layer of silicon dioxide 21 is then deposited on the first layer. These evaporating processes are then alternately repeated until twenty alternate layers are evaporated on plate 12; an additional layer of titanium dioxide (layer 22) is then evaporated on the twentieth layer. The optical thickness of each of the above discribed layers is chosen to be $\lambda_0/4$, where $\lambda_0$ is the center wavelength of the stop band or high reflectance band of the mirror. Finally, a silicon dioxide layer (layer 23) having a $\lambda_0/2$ thickness is then deposited on the last titanium dioxide layer for forming the outermost layer. These layers can be depicted on the end plate 12 by either an electron beam deposition method or a sputtering method.

In the above-described embodiment, it was found that the desired laser wavelength $\lambda_L$ must satisfy the following expression:

$$\lambda_0 + 3/16 \cdot 2\Delta g < \lambda_L < \lambda_0 + \tfrac{3}{8} \cdot 2\Delta g \qquad (a)$$

wherein $\lambda_0$ is the center wavelength of the high reflectance band, $\lambda_L$ is selected to be 4880 Å, and $2\Delta g$ is the bandwidth of the high reflectance band (i.e., wavelength difference between the upper end cutoff wavelength $\lambda_1$ and the lower end cutoff wavelength $\lambda_2$). As is known, $2\Delta g$ can be determined from the ratio of refractive indices of the two stacked transparent materials used.

Figure 4:
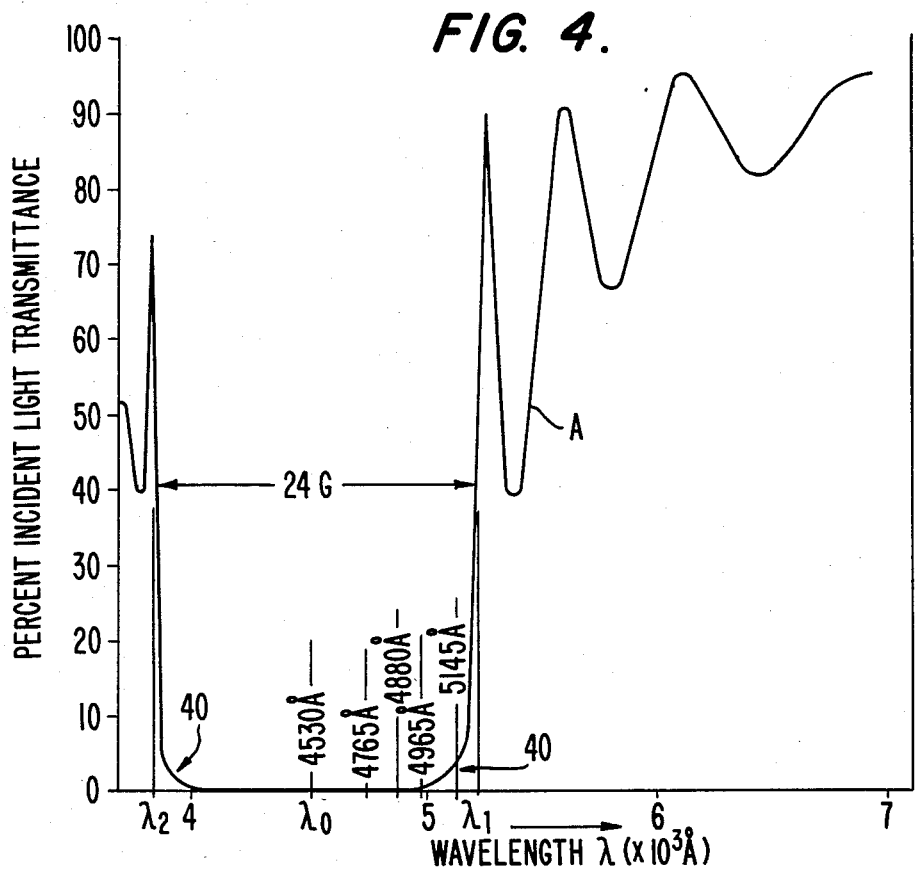
FIG. 4 is a graph of the spectral reflectance characteristics of the high reflectance mirror in accordance with one embodiment of the invention.

FIG. 4 illustrates the spectral transmittance for high reflectance mirror 17 having a center wavelength ($\lambda_0$) of substantially 4530 Å and an upper end and lower end cutoff wavelengths of $\lambda_1 = 3840$ Å and $\lambda_2 = 5220$ Å, respectively. Thus, $2\Delta g (= \lambda_2 - \lambda_1)$ is equal to 1380 Å. Accordingly substituting these values into condition (a):

$$\lambda_0 + 3/16 \cdot 2\Delta g = 4789 \text{ Å}$$

$$\lambda_0 + \tfrac{3}{8} \cdot 2\Delta g = 5040 \text{ Å}$$

It is, therefore, apparent that the criteria of condition (a) is satisfied. It is very important to select a value for $\lambda_0$ permitting adequate oscillation of a monochromatic laser of 4880 Å wavelength. It has been found during life tests that a multilayer mirror comprising titanium dioxide and silicon dioxide has cutoff wavelenghts which were shifted when operating for over 2000 hours. It was found that the cutoff wavelenghts ($\lambda_1$, $\lambda_2$) were shifted downwardly by approximately 100 Å. Therefore, the cutoff wavelength must be precisely determined for the argon gas laser so that $\lambda_L$ continues to satisfy equation (a) even if shifting occurs.

Generally speaking, a multilayer mirror doesn't have sharp cutoff characteristics at the upper and lower ends; rather, a tail portion is formed at both ends (see numeral 40 of curve A: FIG. 4). When the number of deposited layers is increased, this tail portion is somewhat reduced, but does not completely disappear. The tail portion of curve A has a width of about 100 Å. Accordingly, the desired 4880 Å wavelength must always be maintained at a sufficient wavelength amount from both tail portions to permit adequate oscillation even if shifting occurs. On the other hand, increasing the number of layers produces an increase in reflectance. The practical reflectance may be more than 99%. As a result, the optimum number of deposition layers for the high reflective mirror 17 is between 20 and 26. In the embodiment discussed above, utilizing twenty two layers produced a high reflectance mirror with approximately 99.7% reflectance.

To effectively oscillate monochromatic light of 4880 Å, oscillation of the other high gain wavelengths, namely 4765 Å, 4965 Å and 5145 Å must be suppressed by the multilayer mirror. The 4965 Å and 5145 Å wavelengths, which are greater than the 4880 Å wavelength, can be effectively suppressed by designing the mirror to position these wavelength in the tail portion of the curve. For this reason, it is desirable to determine and position $\lambda_0$, based upon condition (a), so that the two higher wavelengths (4965 Å and 5145 Å) fall within the tail portion. It should be noted, moreover, that any downward shift of the cutoff frequency $\lambda_1$ due to aging will place these undesired wavelengths farther into the tail portion and, thereby, increase their suppression. By means of the high reflectance mirror described above, a monochromatic laser oscillation of 4880 Å may be fairly realized. To increase monochromaticity, an output coupling mirror 18 having characteristics described below can be used with the high reflectance mirror 17.

Figure 3:
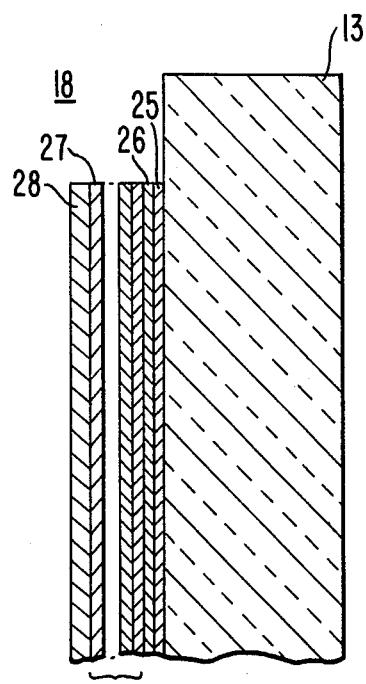
FIG. 3 is an enlarged cross-sectional view of the output coupling mirror shown in FIG. 1.
Figure 5:
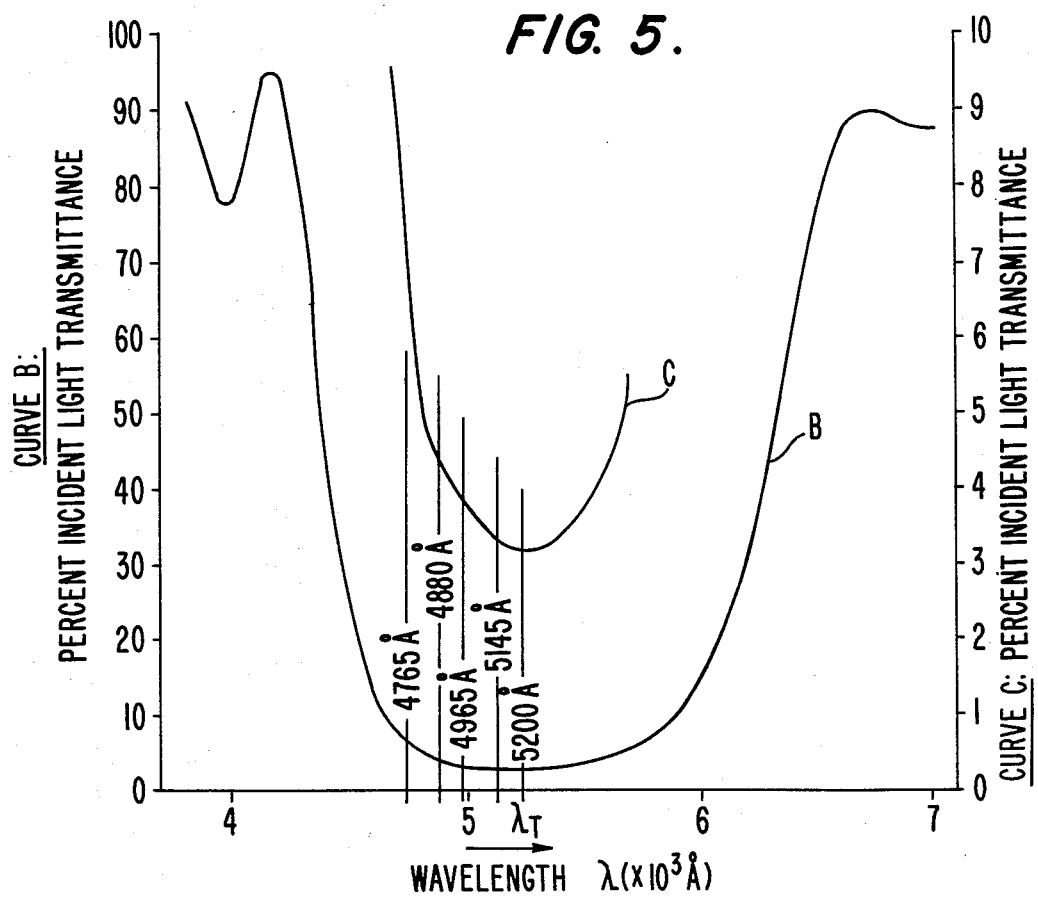
FIG. 5 is a graph of the spectral reflectance characteristics of the output coupling mirror in accordance with one embodiment of the invention, and, FIG. 6 is a graph of the laser output power characteristics versus transmittance of the output coupling mirror of the invention.

FIG. 3 shows an output coupling mirror of this invention. Output coupling mirror 18 comprises a multilayer structure on glass substrate 13 having an optically polished surface. Similar to high reflectance mirror 17, mirror 18 comprises alternate layers of titanium dioxide 25 and silicon dioxide 26, each having a quarter wave stack. A titanium dioxide (or zirconium oxide) layer 27 is then deposited thereon and a final layer of silicon dioxide 28 is deposited on layer 27. The final layer 28 has a double optical thickness relative to the other layers, i.e., $\lambda_T/2$ where $\lambda_T$ is the center wavelength of the high reflective band for output coupling mirror 18. Each of the other layers have a thickness of $\lambda_T/4$; the number of total layers of titanium dioxide and silicon dioxide is between 6 to 14 which is less than the number used for the high reflectance mirror. Mirror 18 has a smaller number of layers than mirror 17 so that it has a decreased reflectance, thereby increasing the transmission of light through mirror 18. The cutoff wavelength characteristics for the output coupling mirror are shown by curves C and B of FIG. 5. As shown, the cutoff portions have a distinct tail portion. The smaller number of layers for mirror 18 provides this distinct tail portion to permit suppression of the other undesired high gain wavelengths, as discussed below.

As shown in FIG. 1, cathode 15 is connected to an electric source 30 and a relatively large discharge current is produced by DC power source 31 connected between anode 16 and cathode 15. As a result, a relatively large discharge current of more than 5 amperes is introduced through the electrodes 15 and anode 16. This discharge current effects the output power of the laser.

Figure 6:
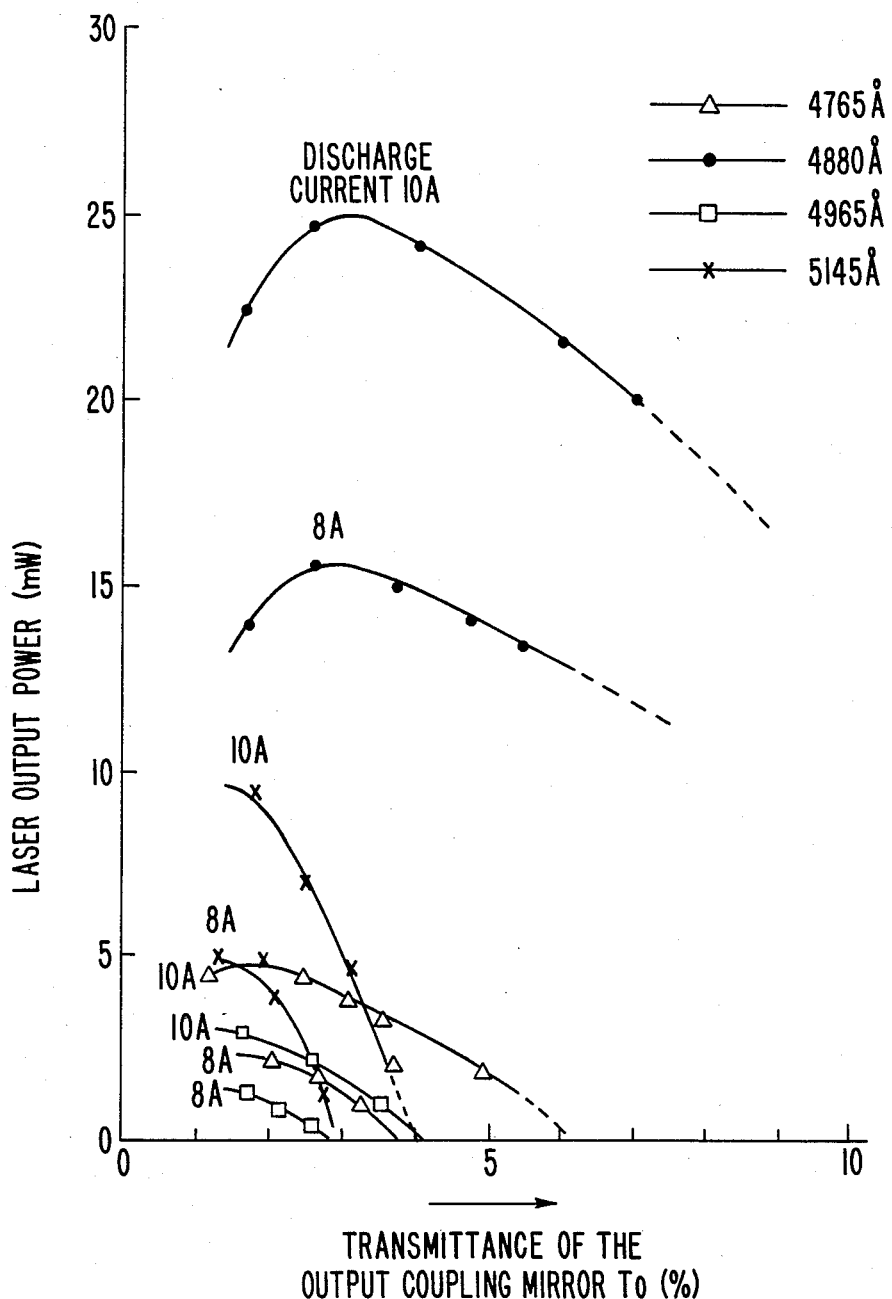

The graph of FIG. 6 shows the laser output power characteristics when high reflectance mirror 17 has a 100% reflectance and a discharge current of 8 and 10 amperes. The abscissa thereof shows the transmittance of output coupling mirror 18. It is clear from this figure that to produce monochromatic light of 4880 Å with tube current of 10 amperes, it is necessary to satisfy the following criteria for the transmittance of output coupling mirror 18 to prevent transmission of the undesired wavelengths listed:

$T_0(4765 \text{ Å}) \geq 6\%$ $T_0(4965 \text{ Å}) \geq 4\%$ (b)

$T_0(5145 \text{ Å}) \geq 4\%$

Considering the 5145 Å wavelength, oscillation of this wavelength is sufficiently suppressed because the reflectance of high reflectance mirror 17 is low as shown by curve A of FIG. 4. Considering the remaining wavelengths and the fact that the highest gain for the 4880 Å wavelength is at a 3% transmittance (FIG. 6), the following optical oscillating conditions for producing only the 4880 Å wavelength could thus be employed:

$T_0(4765 \text{ Å}) \geq 6\%$ $T_0(4965 \text{ Å}) \geq 4\%$ (c)

$T_0(4880 \text{ Å}) \approx 3\%$

As a result, a substantially pure 4880 Å high gain laser may be obtained. It is impossible, however, to provide an output coupling mirror having the desired number of layers to achieve gain (i.e., 6 to 14 layers) while still satisfying the conditions shown in (c). It has been found, nevertheless, that a high gain substantially monochromatic 4880 Å laser can be produced by shifting the center wavelength of the output coupling mirror. That is, an output coupling mirror satisfying the following conditions may be provided by shifting the center wavelength $\lambda_T$ of the reflectance band to the longer wavelength side of 4880 Å (i.e., about 5200 Å), as shown by curves B and C of FIG. 5:

$T_0(4765 \text{ Å}) \geq 6\%$ $T_0(4965 \text{ Å}) \geq 4\%$ (d)

Curve C represents curve B enlarged by a factor of ten, as shown by the axis of the ordinate.

In satisfying condition (c), $T_0(4880 \text{ Å})$ becomes equal to or larger than 4%; as a result, laser output power at 4880 Å becomes 3 to 5% lower than the most optimum condition. This slight decrease in output power, however, can be practically disregarded. Accordingly, as shown in FIG. 6, a monochromatically argon gas laser oscillating at 4880 Å is provided having an output power of more than 20 mW. To increase the degree of monochromaticity, a discharge current larger than 8 amperes can be selected.

The lower gain wavelengths (i.e., 4545 Å; 4579 Å; 4658 Å; 4727 Å; 5017 Å; 5287 Å), as discussed above, have a negligibly small gain and, therefore, are virtually not present in the output.

We claim:

1. An argon gas laser for emitting monochromatic light at 4880 Å at relatively high output power utilizing a relatively high discharge current of more than 5 amps comprising:

an elongated envelope containing argon gas, an optical resonator having a high reflectance multilayer mirror and an output coupling multilayer facing each other and disposed along the optical axis of said envelope, and a cathode electrode and an anode electrode disposed within said envelope for discharging through said gas;

said high reflectance multilayer mirror having between 20 and 26 alternately stacked layers of relatively high refractive index material and relatively low refractive index material, said high reflectance mirror having a high reflectance band with a bandwidth $2\Delta g$ and a center wavelength $\lambda_0$, said center wavelength having a value less than 4880 Å such that the difference between $\lambda_0$ and 4880 Å is an amount between 18.75% and 37.5% of the bandwidth of said high reflectance band, each of said alternately stacked layers having a thickness of $\lambda_0/4$, said high reflectance band of said high relfectance mirror having a tail portion containing high gain wavelengths longer than 4880 Å so that said high reflectance mirror has a higher transmittance of said longer high gain wavelengths positioned in said high reflectance band than the transmittance of said high reflectance mirror for light at 4880 Å;

said output coupling multilayer mirror having between 6 and 14 alternately stacked layers of relatively high refractive index material and relatively low refractive index material, said output coupling mirror having a high reflectance zone with a center wavelength longer than 4880 Å and a transmittance of approximately 3% to 6% at 4800 Å.

2. An argon gas laser device according to claim 1 wherein said relatively high refractive index material is made from titanium dioxide and said relatively low refractive index material is made from silicon dioxide.

3. An argon gas laser device according to claim 1 wherein a potential means is connected between said electrodes for stimulating said argon gas with discharge current of more than 5 amperes.

4. An argon gas laser device according to claim 1 wherein said center wavelength $\lambda_0$ of said high reflectance mirror is approximately 4500 Å and said center wavelength of said output coupling mirror is approximately 5200 Å.

5. An argon gas laser device according to claim 1 wherein said high reflectance mirror and said output coupling mirror are sealed with said envelope, said mirrors forming an inner mirror-type optical resonator.

6. An argon gas laser according to claim 1 wherein said output coupling mirror has a transmittance of approximately 4% to 6% at 4880 Å.

* * * * *